Nov. 22, 1960  B. R. HERMANN  2,961,518
CIRCUIT INTERRUPTER

Filed Oct. 11, 1957  3 Sheets-Sheet 1

POLYESTER OR EPOXY RESIN AND HYDRATED ALUMINA

Inventor,
Benjamin R. Hermann,
by Gilbert P. Tarleton
His Attorney.

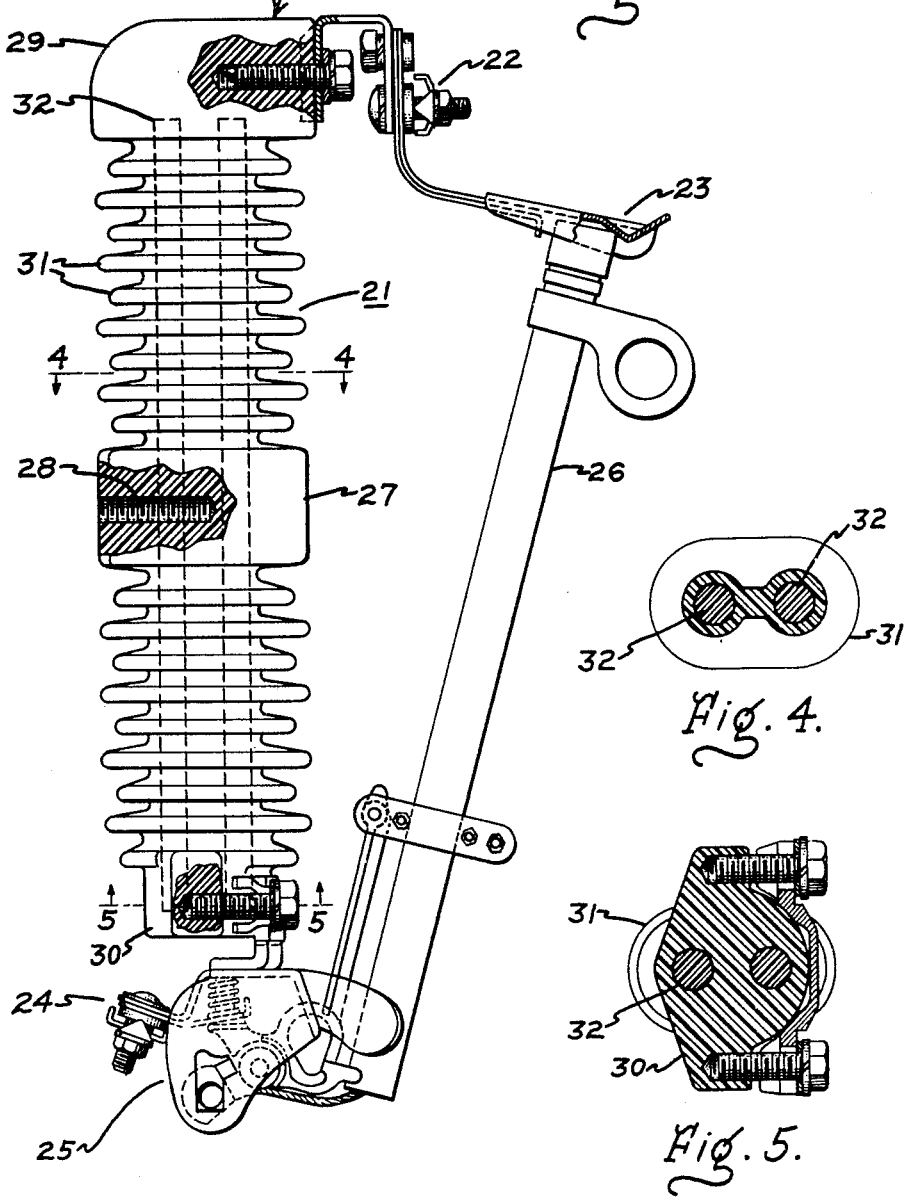

Inventor,
Benjamin R. Hermann,
by Gilbert P. Tarleton
His Attorney.

United States Patent Office 2,961,518
Patented Nov. 22, 1960

2,961,518

CIRCUIT INTERRUPTER

Benjamin R. Hermann, Pittsfield, Mass., assignor to General Electric Company, a corporation of New York Filed Oct. 11, 1957, Ser. No. 689,734

8 Claims. (Cl. 200—166)

This invention relates to circuit interrupters, and more particularly, to electrical circuit interrupters such as open and enclosed type cutouts.

Prior art open type cutouts utilize porcelain column insulators and enclosed cutouts use porcelain box shaped housings. These porcelain members have several disadvantages. For instance, they are not lightweight, and on high impact they are apt to fracture into many small sharp flying pieces. Additionally, it is difficult to maintain close tolerances or dimensional accuracy in porcelain pieces. Also, due to the manufacturing cycle their procurement time is not of short duration.

From an electrical point of view, these ceramic members have several shortcomings. For instance, they require long creep distances for a given air strike distance. A flashover or power arc will chip the petticoats of the insulators. Also, a flashover or power arc will tend to play against the insulator surface and scorch it.

It is an object of this invention to provide an improved electrical circuit interrupter which will overcome the above disadvantages.

It is a further object of this invention to provide improved insulators and housings for open and enclosed type cutouts which will overcome the above disadvantages.

In my invention the insulation of electrical circuit interrupters is made from improved organic electrical insulating materials which are resistant to carbon tracking due to power arcing and surface creepage. For instance, in open and enclosed type cutouts the insulators and housings are made from improved organic electrical insulating materials which are resistant to arc tracking and surface creepage.

These materials per se are not part of my invention, but are claimed and disclosed in copending Norman and Kessel patent application Serial Number 633,356 for Electrical Apparatus Insulation which was filed on January 9, 1957 and is assigned to the same assignee as the instant patent application. However, as far as I am aware, I am the first to have invented electrical circuit interrupters which utilize these improved organic electrical insulating materials in the manner and for the purposes hereinafter disclosed.

These materials provide many advantages over porcelain insulation. For instance, when the insulators are made from these materials they are lighter in weight than equivalent porcelain insulators, and will not fracture into many small sharp flying pieces under high impact. Also, they can be cast or molded to very close tolerances. This facilitates connecting the necessary hardware to the insulation, or the hardware can be molded or cast directly into the insulation. Additionally, the manufacturing cycle for the insulation is very short as contrasted to porcelain. This reduces the procurement time and the necessity for storing large quantities of insulators and housings.

As heretofore stated, these improved organic electrical insulating materials are resistant to carbon tracking due either to surface creepage or to power arcing. In outdoor installations or others where there may be accumulations of dust, rain and other environmental contaminants random surface discharges or arcing known as surface creepage are promoted between insulated elements. The discharge conditions occasion the formation of carbonaceous deposits in conventional organic insulation, ultimately yielding low resistance paths or tracks which destroy further utility of the insulation. Discharges of the creepage type are to be distinguished from those caused by the establishment of a power arc through or directly between two elements having different potentials. Under arcing conditions, while the organic insulation adjacent to the arc is carbonized, the arc track so formed is not random in character but forms a direct path along the line of the arc. On the other hand, tracks due to creepage are random in effect, and produce a tree-like path. The difference between tracking due to arcing and tracking due to creepage is further pointed out in ASTM test D495-48T in which it is specifically stated that the test directed to determining the resistance of insulating material to arcs does not in general permit conclusions to be drawn as to the resistance of the material to other types of arcs such as those promoted by conducting contaminants. It is further pointed out that in the creepage type of electrical failure, failure of the material can occur not only due to surface failure but to subsurface failure. It is evident from the above that materials which are effective in protecting against the effects of direct arcing are not necessarily effective in protecting against creepage breakdown.

Heretofore organic insulating materials have been avoided in the construction of electrical equipment wherein such materials would be subjected to the influences of electrical discharges, even though these materials would otherwise have been attractive because of other considerations. Some organic insulating materials which experience this limitation are epoxy and polyester resins.

By way of summary, when critical amounts of hydrated alumina are incorporated in the organic insulation, then uniquely, the creepage discharges occurring across the surface of the insulation even under the most severe contaminating conditions do not result in tracking and breakdown inasmuch as low resistance carbonaceous deposits are not permitted to form. Organic materials which may be combined with hydrated alumina with particular advantage include epoxy and polyester resins. It is believed that the combined water in the hydrated alumina serves to oxidize the carbonaceous particles formed under arcing and creepage conditions and that the aluminum oxide component itself acts as a catalytic agent to indirectly promote this oxidation. While unhydrated aluminum oxide is useful in delaying tracking under surface creepage conditions, it is not effective in oxidizing carbonaceous materials or in preventing the eventual failure of insulation due to creepage tracking.

When the hydrated alumina comprises 20 to 70% by weight of the combined epoxy resin-hydrated alumina insulation, failure due to creepage is substantially eliminated. When the hydrated alumina constitutes from about 40 to 70% by weight of the composition failure due to creepage tracking is wholly eliminated. When polyesters are used, the hydrated alumina is used in the proportion of from 20 to 70% by weight of the insulation, and preferably 30 to 70%.

Electrically, these improved organic insulating materials provide several advantages over porcelain. With these materials a greater creep distance can be readily obtained for a given air strike distance because complicated surfaces are easier to form. When subjected to a power arc their petticoats will not be chipped, and the arc will not tend to play against the insulator surface as with porcelain. Rather, due to their gas generating characteristics the arcs are blown away from the insulation.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings, in which:

Fig. 3 is an elevation view of a second form of my invention; and

Fig. 4 is a sectional view taken along the line 4—4 of Fig. 3; and

Fig. 5 is a sectional view taken along the line 5—5 of Fig. 3; and

Figure 1:
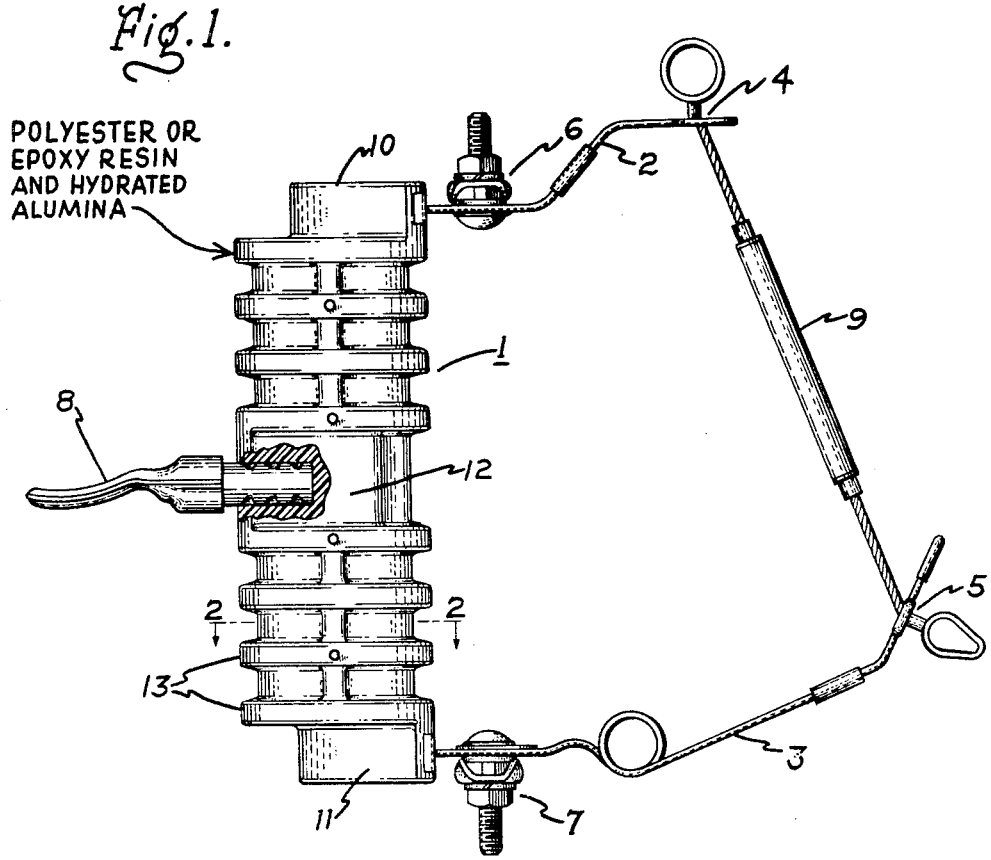
Fig. 1 is an elevation view of one form of my invention.

Referring now particularly to Fig. 1 of the drawings, illustrated therein is a flip-open type fuse cutout. It comprises a generally elongated insulator 1 which carries a pair of resilient arms 2 and 3. The outer ends of the arms have contact portions 4 and 5, and the arms also have terminals 6 and 7 thereon. A bracket 8 may be used to mount the insulator from the cross arm of a not shown line pole, and a not shown line pole transformer can be energized by an electrical distribution line by connecting the transformer to terminal 7 and the distribution line to terminal 6. The contacts 4 and 5 are interconnected by a fuse assembly 9. If an overcurrent should occur in the transformer a fuse element in the assembly 9 will melt and the opposite ends of the fuse link will be separated to interrupt the circuit. The lower arm is more resilient than the upper arm. Therefore, when the fuse link melts the arm 3 flips the lower end of the fuse link away from the upper end of the fuse link.

Figure 2:
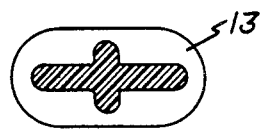
Fig. 2 is a sectional view taken along the line 2—2 of Fig. 1.

The opposite ends of the insulator 1 have enlargements 10 and 11 formed thereon so that the inner ends of the arms 2 and 3 can be molded or cast directly into the insulator 1. The mounting bracket 8 is likewise cast or molded into the insulator 1. For this purpose the central portion of the insulator may have an enlarged area 12. The portions of the insulator intermediate the enlargements 10 and 12 may have a cruciform cross section as illustrated in Fig. 2 in order to provide the necessary strength while simultaneously conserving on the amount of electrical insulation being utilized. These cruciform parts may have integral petticoats 13 to provide the necessary creep distance between the hardware 2, 3 and 8.

Referring now to Fig. 3 of the drawings, shown therein is another form of my invention which comprises an open-type fuse cutout. The cutout employs a generally elongated insulator 21 which has suitable hardware connected to its opposite ends. The upper hardware provides a terminal 22 and a latch 23. The latch 23 also serves as a contact. The lower hardware comprises a terminal 24 and a hinge 25. The hinge 25 provides a contact for the lower end of a fuse assembly 26 which spans the upper and lower hardware. The lower end of the fuse assembly 26 is hinged to the element 25. This is a well known form of open-type dropout fuse cutout and therefore the details of the hardware and the fuse assembly will not be described.

This form of circuit interrupter also may be suspended from the crossarm of a line pole. It may be utilized to protect an electrical apparatus such as a pole-type transformer by connecting the terminal 24 to the transformer and the terminal 22 to an electrical distribution line. When an overcurrent develops in the transformer a fuse link of the fuse assembly will melt which will free the fuse assembly to unlatch itself from the latch 23 and pivot open.

The central portion of the insulator 21 has a solid section 27 and this solid section may have one or more threaded and blind bores 28 machined, cast or molded therein. This is for the purpose of connecting a mounting bracket or strap to the back of the insulator 21 so that the circuit interrupter can be mounted on the crossarm of a line pole. The upper and lower hardware can be connected to the opposite ends of the insulator 21 in a similar manner. That is, the ends of the insulator 21 may have solid sections 29 and 30, and these solid end sections may have one or more threaded and blind bores formed therein for the purpose of receiving screws, threaded bolts or the like.

The portions of the insulator intermediate the solid sections 27, 29 and 30 have reduced cross sections as illustrated in Fig. 4 in order to conserve on the arc tracking and surface creepage resistant hydrated alumina and organic insulating material. These reduced portions may have integral petticoats 31 formed thereon to provide the necessary creep distance between the upper and lower hardware and the hardware which is to be connected to the central section 27.

In either the first or second forms of the invention the insulation may comprise polyester or epoxy resin having the aforementioned critical ranges of hydrated alumina interspersed therein. In the first form of the invention due to the nature of the cutout, that is, the absence of high recoil forces on the insulator by the fuse assembly, the insulation can be slightly flexible or pliable or it may be one that is rigid. However, in the second form of the invention the fuse assembly is closed at its upper end and vented at its lower end. This type of fuse assembly typically has gases expelled out of its vented end and imposes high recoil forces on the insulator. Therefore, the insulator should not be flexible or pliable lest it be distorted and its contact and hinge elements be moved out of alignment. Rather, it should be rigid and have a high impact strength. Rigidity and high impact strength are difficult to obtain in these insulators if reduced cross sections are utilized to conserve on the insulation. Therefore, the equivalent of this is obtained by making the insulators from insulation which is slightly flexible or pliable and then reinforcing them with rigid and high impact strength inserts. Such polyesters and epoxies are well known in the art as per chapter 8 of Polyesters And Their Applications by Bjorksten Research Lab., published in 1956 by Rienhold Publishing Company of New York, N.Y., and chapter 7 of Epoxy Resins Their Applications And Technology by Lee and Neville, published in 1957 by McGraw-Hill Book Co. of New York, N.Y.

When slightly flexible or pliable polyesters or epoxies are used in the second form of the invention rigidity and high impact strength is obtained by encapsulating one or more reinforcing members in the insulator 21. For instance, the reinforcing means may comprise a pair of lengthwise extending rigid and high impact strength rods 32. The rods 32 may be fabricated from glass strands which have been impregnated with polyester resin, but other non-metallic as well as metallic reinforcing means could be used.

In the first form of the invention slightly pliable or rigid insulating material can be readily used without reinforcing means since high recoil forces will not be put on the insulator. Therefore, it will not be distorted if it is somewhat pliable, and even if it is distorted slightly the fuse assembly can be readily engaged with the contact arms. Also, if the insulator is rigid but does not have a very high impact strength due to its thin cross section still it will not be cracked because of its freedom from high recoil forces.

Sometimes in open type dropout cutouts of the type shown in the second form of the invention recoilless or double vented overcurrent interruption mechanisms are used. In such cases slightly pliable insulation might be unnecessary and if it were used the reinforcing means might be omitted.

Aside from conserving material, an additional reason for using thin cross sections in the insulators when polyesters are used is that they undergo exothermic reactions during their setting. If the insulator sections were thick, cracks might be developed in the insulator.

In both forms of the invention the mounting bracket is located on a side of the insulator opposite from the side on which the fuse assembly and upper and lower hardware are located. This is for bird-proofing purposes. For instance, with the brackets mounted in the back of the insulator it is very difficult for a bird or small animal to be perched thereon and simultaneously reach around to the other side of the insulator and contact the fuse assembly or its hardware and thereby cause an outage.

Additionally, the invention makes it possible to connect the hardware to the insulator body in an easy manner which has heretofore been unattainable with porcelain insulators. For instance, in the prior art one common method of attaching the supporting or mounting bracket to the insulator has been to cement it into the insulator. This has posed special problems since the cement had to match the thermal expansion characteristics of the insulator body as well as the metallic hardware. In other instances, the hardware was clamped to the insulator body. This required special fittings in order to place the porcelain in compression inasmuch as porcelain has a higher compressive strength than tensile strength. Besides being less subject to breakage than porcelain, the organic insulation provides a dimensional accuracy which makes it very convenient to connect the hardware. For instance, since the insulation can be molded or cast to very close tolerances it is possible to provide means such as threaded blind bores 28 with which to connect a mounting strap and the terminal and contact hardware. This procedure would be impossible with porcelain inasmuch as it inherently requires wide tolerances due to its shrinkage characteristics.

Electrical porcelain has a long manufacturing cycle due to the long prefiring, firing and cooling stages. Therefore, heretofore it has been necessary to procure the porcelain insulators in advance and stock them in rather large quantities in order to have a sufficient number available for assembling and shipping the circuit interrupters for prompt delivery. The invention makes it unnecessary to stock a large number of insulators or order them far in advance inasmuch as they can be produced very rapidly by molding or casting procedures. In fact, the invention makes it possible to incorporate the manufacture of the insulators into an assembly line production for the complete circuit interrupter.

From an electrical point of view, the invention provides a superior insulator as contrasted to porcelain insulators. Due to the surface creepage resistance of the new insulation the creep distance between adjacent and spaced hardware does not need to be as long for a given air strike distance as with porcelain. This makes it possible to utilize a smaller number of petticoats or other complicated surfaces than in porcelain insulators.

Additionally, power arcs will not have a deleterious effect on the insulation as with porcelain. When the insulation is subjected to a power arc, oxygen and water vapor will be evolved by virtue of the hydrated alumina additive. These gases will force the arc away from the surface of the insulation. The released oxygen, of course, combines with any carbon which is decomposed from the insulation into carbon dioxide to carry the free carbon away into the atmosphere whereby no carbon tracks are left along the surface of the improved insulator.

Figure 6:
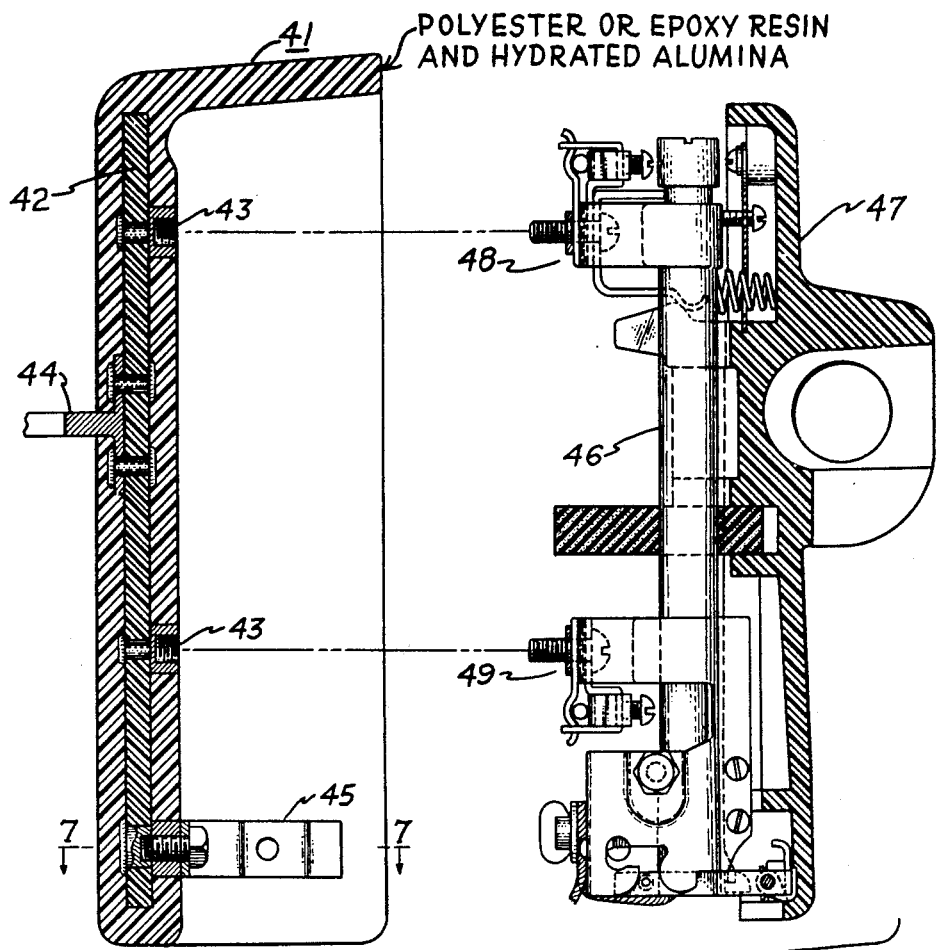
Fig. 6 is an exploded elevation view of a third form of my invention.
Figure 7:
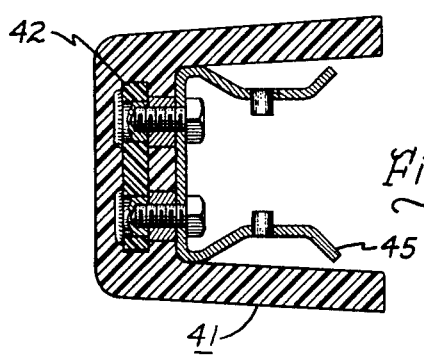
Fig. 7 is a sectional view taken along the line 7—7 of Fig. 6.

As illustrated in Fig. 6 of the drawings, the invention is also applicable to housed circuit interrupters. The illustrated third form of the invention comprises an enclosed-type fuse cutout. One form of this type of cutout is described in detail in construction and operation in Smith, Jr. et al. Patent 2,744,982 which is assigned to the same assignee as the present invention.

The generally elongated insulator for the circuit interrupter comprises a generally elongated box-shaped housing 41. Since the housing 41 has relatively thin sections it is constructed from slightly flexible and pliable polyester or epoxy insulating material which has a reinforcing member 42 in its back. The reinforcing member 42 has a mounting strap 44 connected thereto by suitable means such as rivets or nuts and bolts. Terminal and contact and hinge fittings 43 can also be directly connected to the reinforcing member 42. These fittings 43 are adapted to have terminal contact assemblies 48 and 49 and hinge element 45 very easily connected thereto by means such as screws or threaded bolts. The hinge element 45 is adapted to have a combination fuse assembly 46 and door 47 hinged thereto. The terminal contact assemblies 48 and 49 are adapted to cooperate respectively with the fuse assembly contacts.

Since the reinforcing member 42 has hardware connected thereto which is at different electrical potentials the member 42 is constructed from electrical insulating material. The member 42 is made from a structurally strong and rigid material inasmuch as it is intended to withstand the recoil forces of the fuse assembly and keep the terminal contact assemblies 48 and 49 as well as the hinge element 45 properly aligned. However, since it is sheathed in the improved insulation 41 which is resistant to surface creepage due to atmospheric contaminants it can be made from resin impregnated glass strands or other conventional electrical insulating materials.

With porcelain housings it was extremely difficult to properly align the terminal contact assemblies 48 and 49 and the hinge element 45 since these parts were cemented into the back of the housing. In my invention it is very easy to align these parts inasmuch as the fittings 43 are preassembled in the reinforcing member 42. Thereafter, the member 42 and its attached hardware is encapsulated in the organic insulation by molding or casting procedures.

The several advantages of my invention heretofore discussed are also applicable to the third form of the invention. In all the illustrated forms of the invention the circuit interrupters are automatically operable and can also be operated manually. However, the invention is useful in circuit interrupters which are only manually operable or automatically operable as well as circuit interrupters of the fuseless type. In the third and second forms of the invention it is a common expedient to break the load by opening the door or unlatching the fuse assembly. When this is done it is not infrequent for a sustained power arc to be drawn between the stationary contacts and the movable contacts. In my invention, due to the gas and vapor generating characteristics of the improved insulation, it is believed that power arcs will be less apt to be established and maintained when the load is broken by manually moving the fuse assemblies to open position.

While there have been shown and described particular embodiments of the invention, it will be obvious to those skilled in the art that changes and modifications may be made without departing from the invention, and therefore, it is intended by the appended claims to cover all such changes and modifications as fall within the true spirit and scope of the invention.

What I claim as new and desire to secure by Letters Patent of the United States is:

1. In an electrical circuit interrupter which comprises a pair of contacts and means for opening and closing said contacts, said contacts and means being supported by organic electrical insulation which tends to form low resistance carbonaceous deposits under the influence of creepage type electrical discharges occurring under contaminating conditions and means for preventing the formation of said carbonaceous deposits due to creepage, said last mentioned means comprising hydrated alumina interspersed in said insulation in the amount of from 20 to 70% based on the weight of said insulation and hydrated alumina.

2. In an electrical circuit interrupter which comprises a generally elongated electrical insulator which supports a pair of spaced contacts and means for opening and closing said contacts, said contacts being located adjacent opposite ends of said insulator and said means being located along one side of said insulator, insulator mounting means located along a central portion of said insulator and on an opposite side of said insulator, said electrical insulator having an outer surface which is constructed from an organic electrical insulating material which is resistant to arc tracking and surface creepage, said insulating material comprising from 20 to 70 percent by weight of hydrated alumina.

3. In an electrical circuit interrupter as in claim 2, wherein said insulator has a reinforcing member which is encapsulated in said organic electrical insulating material.

4. In an electrical circuit interrupter as in claim 2, wherein said insulator has an electrical insulation material reinforcing member, said contacts and mounting means being connected to said reinforcing member, and said reinforcing member being encapsulated in said organic electrical insulating material.

5. In an electrical circuit interrupter as in claim 2, wherein the portions of said insulator intermediate said ends and central portion have cruciform transverse cross sections, said intermediate portions having a plurality of spaced and transverse integral petticoats.

6. A generally elongated insulator for supporting an open type circuit interrupter, said insulator being molded from an organic electrical insulating material which is resistant to arc tracking and surface creepage, said insulating material comprising from 20 to 70 percent by weight of hydrated alumina, said insulator having means molded into the opposite ends thereof for supporting said circuit interrupter along one side of said insulator, means molded into a central portion of said insulator for supporting said insulator from an opposite side thereof, said ends and central portion having heavy transverse cross sections relative to the remaining portions of said insulator, said remaining portions having a plurality of spaced and transverse integral petticoats.

7. A circuit interrupter comprising a generally elongated electrical insulator which is molded from an organic electrical insulating material which is resistant to arc tracking and surface creepage, said insulating material comprising from 20 to 70 percent by weight of hydrated alumina, said insulator having hardware which is connected thereto by being molded into said organic electrical insulating material.

8. A housing for an enclosed type circuit interrupter comprising a generally elongated and box-shaped insulator member which is molded from an organic electrical insulating material which is resistant to arc tracking and surface creepage, said insulating material comprising from 20 to 70 percent by weight of hydrated alumina, the back of said insulator member having an electrical insulating material reinforcing member embedded therein, mounting means connected to said reinforcing member for supporting said insulator member from the rear thereof, and spaced fittings connected to said reinforcing member for supporting said circuit interrupter inside said insulator member.

References Cited in the file of this patent
UNITED STATES PATENTS

| | | |
|---|---|---|
| 2,036,825 | Pattman | Apr. 7, 1936 |
| 2,606,954 | Baker | Aug. 12, 1952 |
| 2,740,016 | Hughes | Mar. 27, 1956 |